March 26, 1929. E. C. PARHAM 1,706,937
PROTECTIVE DEVICE FOR ELECTRIC SYSTEMS
Filed Sept. 22, 1924 3 Sheets-Sheet 1
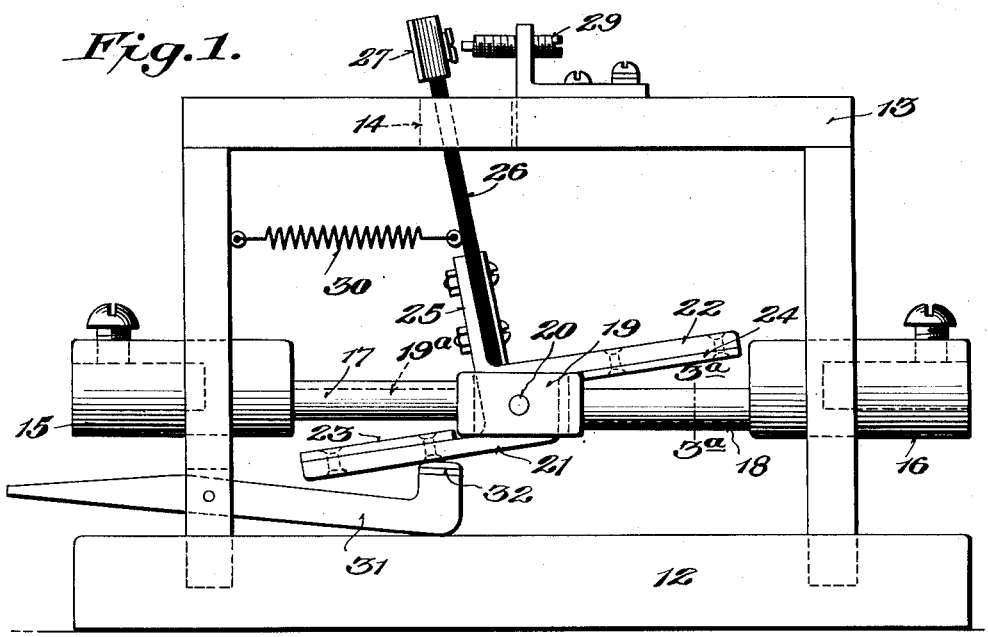
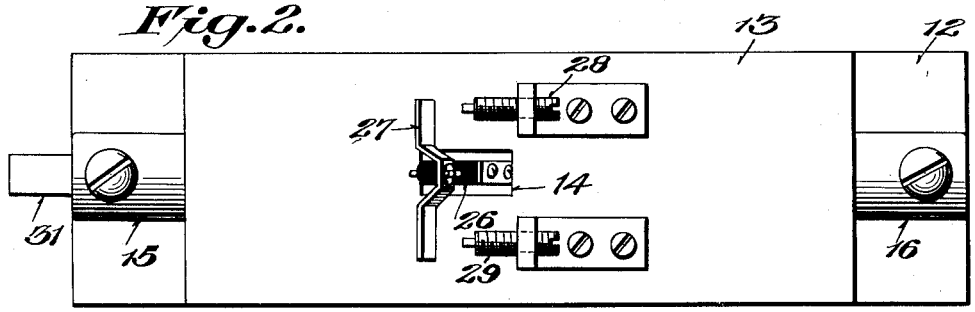
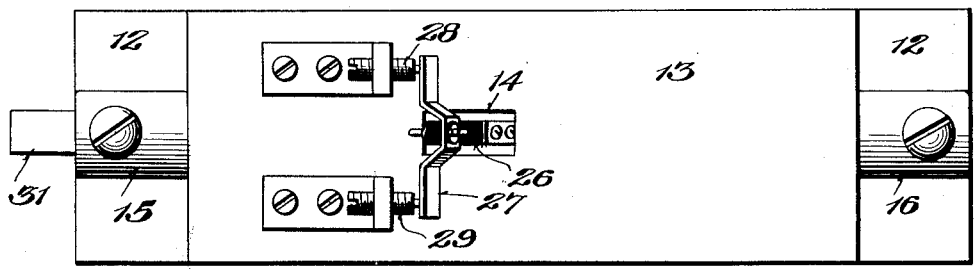
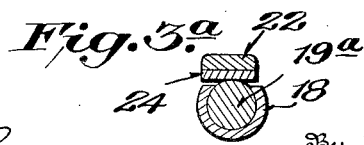

March 26, 1929.　　　E. C. PARHAM　　　1,706,937
PROTECTIVE DEVICE FOR ELECTRIC SYSTEMS
Filed Sept. 22, 1924　　　3 Sheets-Sheet 2
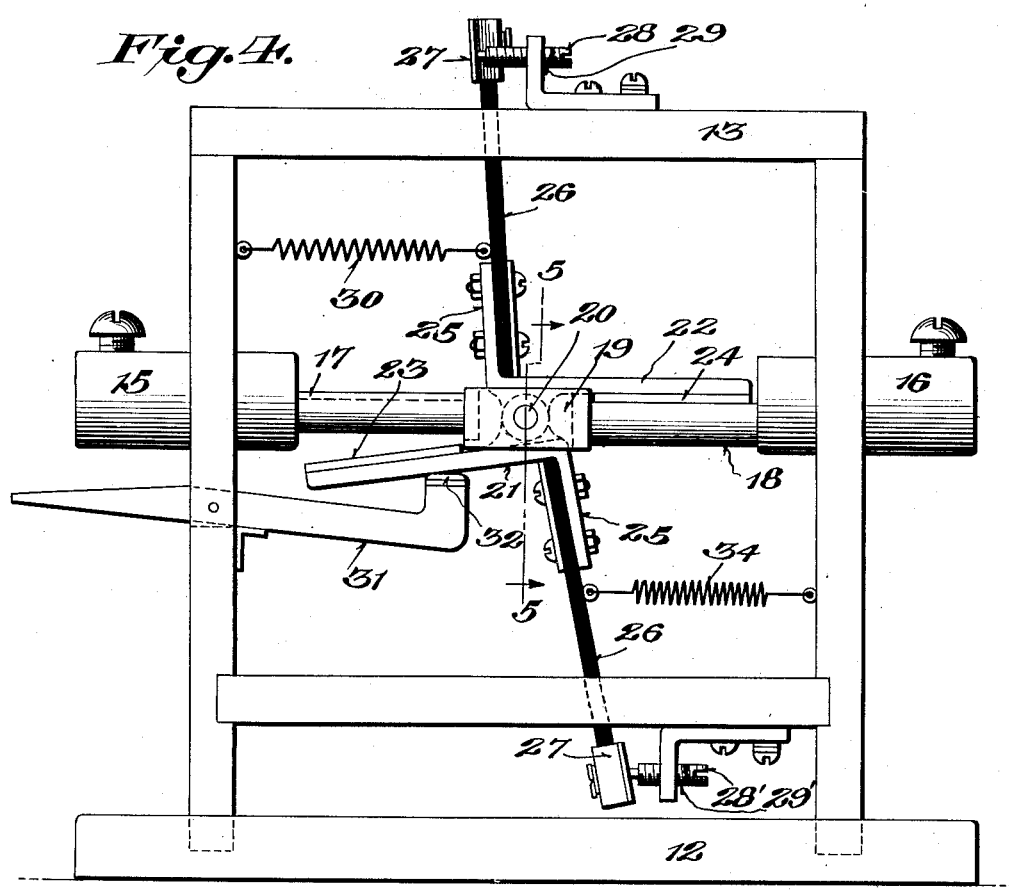
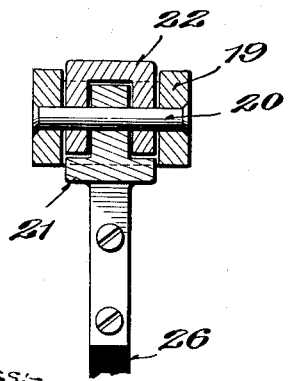
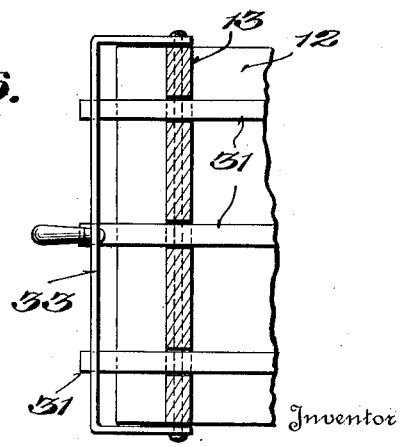
Inventor
Eugene C. Parham,
By Royal E. Burnham,
Attorney
Witness:—
Chas. L. Griesbauer

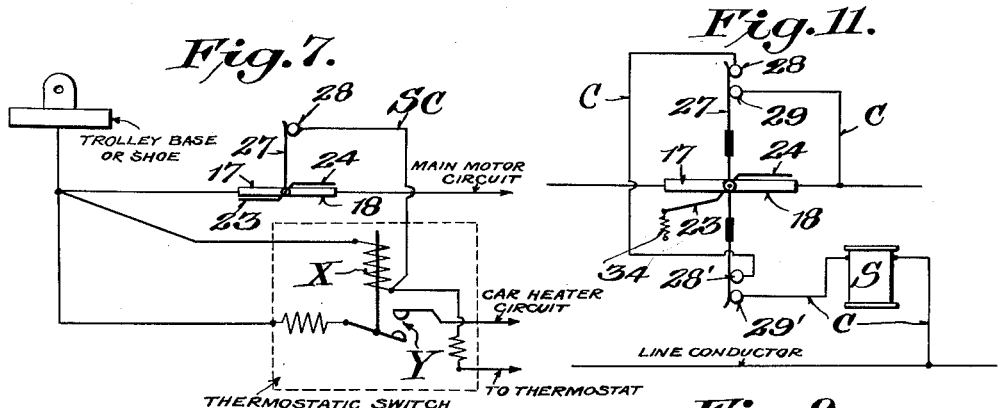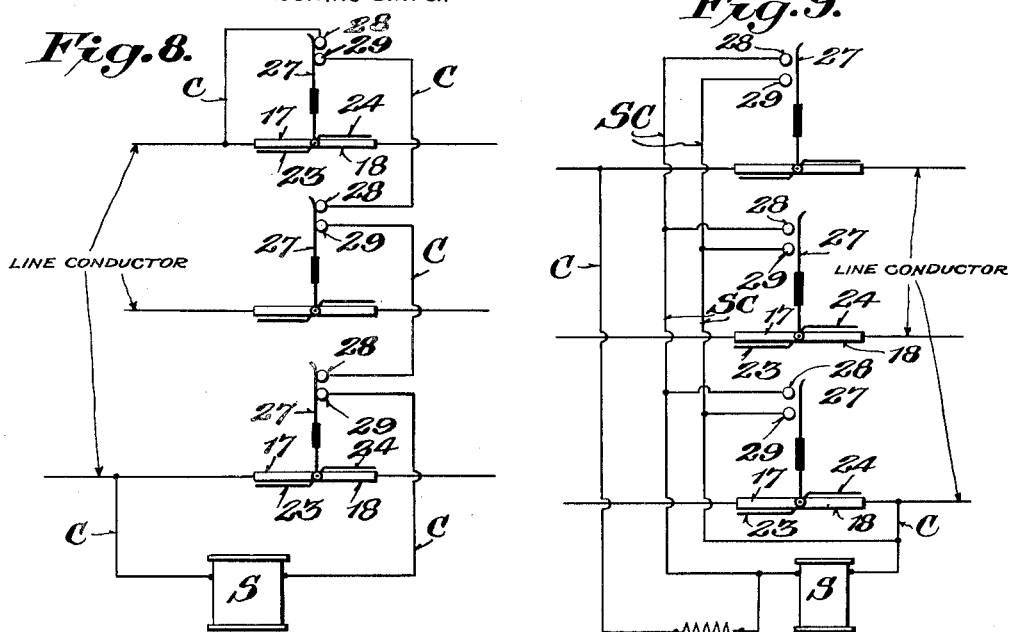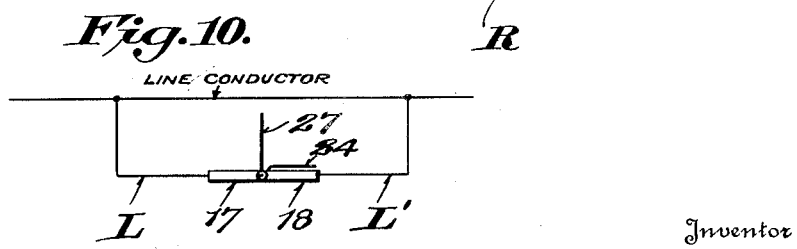

Patented Mar. 26, 1929.

1,706,937

UNITED STATES PATENT OFFICE.

EUGENE CHILTON PARHAM, OF BROOKLYN, NEW YORK.

PROTECTIVE DEVICE FOR ELECTRIC SYSTEMS.

Application filed September 22, 1924. Serial No. 739,220.

The device provided by this invention is an electro-magnetic relay and interlock adapted particularly to protection of motors and other parts associated with polyphase circuits, and its action is responsive automatically to fall of current below a predetermined value in any or all of the phases, to failure of any or all phases, or to overload in any or all phases of the circuit.

Although it primarily is an object of the invention to provide a device that will prevent accidental singlephase operation of polyphase motors, the device also is adapted for association with direct-current motors.

Among the objects of the invention is to provide a reliably and efficiently functioning device for these and similar purposes that is composed of relatively few parts that can be produced and assembled economically, that is devoid of expensive electromagnets and coils, that is adaptable to circuits of practically any current value without change in relay parts, and that is adjustable to practically any maximum current value.

When considered with the description herein, the characteristics of the invention are apparent from the accompanying drawings, forming part hereof, wherein embodiments of the invention are disclosed, for purposes of illustration.

Although the disclosures herein exemplify what now are considered to be preferable embodiments of the invention, it is to be understood that it is not the intention to be limited necessarily thereto in interpretation of the claims, as modifications and adaptations within the limits of the claims can be made without departing from the nature of the invention.

Like reference-characters refer to corresponding parts in the views of the drawings, of which—

Fig. 1 is a side elevation;
Fig. 2 is a plan view;
Fig. 3 is a view illustrative of another position of fixed contacts;
Fig. 3ª is a section on the line 3ª—3ª, Fig. 1;
Fig. 4 is an elevation of an adaptation of the invention to a no-load relay and overload relay in a single device;
Fig. 5 is a section on the line 5—5, Fig. 4;
Fig. 6 is a fragmentary view of several of the devices arranged to have their setting-levers operated together; and Figs. 7, 8, 9, 10, and 11 are diagrammatic views illustrative of installations of the device.

The device may be disposed in or on any suitable structure, such as a frame or case 12, preferably of insulating material. One of the members or walls 13 may have an elongated opening or slot 14 extending therethrough.

In the exemplified forms of the device, a current element, which is of a capacity to carry main line current or a shunt current of a main line, includes two alined terminal members 15 and 16 supported in frame or case parts and arranged to be connected at their outer portions with conductors of a circuit; two straight elongated armatures 17 and 18 of magnetizable material such as soft iron in the form of pipes or tubular members, each of which is fixed to and extends from one of the terminal members toward the other and constitutes a conductor part of the current element; and a slotted enlarged intermediate member 19 to which the armatures fixedly are connected. The parts 15, 16, and 19 of the current element, and rod parts 19ª thereof in the armatures 17 and 18 may be formed of a single piece of material. The several parts of the current element are in substantial alinement and thus afford a substantially straight conductor. One or more rockable or swingable elements of the device are mounted in the slotted member 19 on a pivot 20.

As disclosed by Fig. 1, the rockable or swingable element includes oppositely-extending arms 21 and 22, constituting armature members, so disposed that armatures 23 and 24 thereon may be swung toward and from the fixed armatures 17 and 18, respectively. The respective adjacent and cooperating armatures are machined or otherwise shaped and finished to afford uniform or corresponding contour of their contacting or adjacent surfaces, in order that contact may be effected substantially throughout their areas. Thus, for example, complementary faces of the fixed and movable armatures may be flat, or they may be, respectively, rounded and convex. Moreover, in some circumstances, in order that the difference between the current value at which the relay closes and the value at which it opens may not be too great, the fixed armatures so may be formed that the movable armatures do not come into contact with them, but with the rod parts 19ᵃ, as shown by Fig. 3ᵃ.

The rockable or swingable element also includes an arm 25 on its intermediate portion, to which is connected and from which extends an arm 26, which projects through the slot 14, and which is of insulating material when the device is associated with a polyphase alternating-current system. On its outer portion the arm 26 carries a bridging contact or contact-head 27, arranged, when the arm is swung, to make or break bridging contact with two adjustable fixed contacts 28 and 29 on the frame or case member or wall 13.

The current element of the device is connected at its terminals 15 and 16 in and as a part of a line circuit, or in some circumstances in and as a part of a shunt circuit, and the contacts 28 and 29 are connected in another circuit, in a manner such as hereinafter explained.

Movement of the rockable or swingable element and alteration of the position of the contact member 27 with respect to the contacts 28 and 29 are effected as a result of change of current condition in the current element, such as fall of current below a predetermined value, failure of any or all phases, or overload in any or all phases, dependent upon the particular way the device is associated in a system.

The device utilizes magnetic lines of force surrounding a straight conductor for a considerable portion of its length to swing, through the instrumentality of attracted armatures, the contact-head in one direction and to hold the movable armatures in attracted positions. Normally, so long as current of predetermined value is in the current element, those armatures remain in attracted positions; or one of them normally may remain open, as in an over-load device such as hereinafter described. The movable armatures are moved and held away from the fixed armatures either by gravity or by a spring 30. This spring, however, so is tensioned that it offers no resistance to movement of the movable armatures toward the fixed ones until the former almost have reached their final attracted positions. Accordingly, the spring tends to release the relay from attracted position of the movable armatures without affording an effort that has to be overcome at a time the current starts closing movement.

An important characteristic of the device as a whole is that its current capacity need not be changed to suit the current rating of various circuits, because the same result may be obtained by shunting it across a suitable length of any size feeder.

The contact-head 27 preferably is made of spring material, such as comparatively thin sheet brass, for example, and it and the contacts 28 and 29 so are coordinated and adjusted that there is appreciable wipe for the contacts and the relay will not open its contacts even with considerable variation in the value of the line current.

A lever 31, of non-conductive material, is provided for manually closing the movable armatures and thus resetting the device in some circumstances. The current required to attract the movable armatures toward the current element depends largely upon their distance apart when open. By placing liners or shims 32 on the heel of the lever, the movable armatures may be held initially nearer to the fixed ones, from which positions they may be moved to closed positions by materially lower current. In a polyphase system, requiring two or more relays, the levers 31 may be arranged to be operated simultaneously, as by a lever 33 such as disclosed by Fig. 6.

In the device as exemplified by Figs. 1, 2, 3, and 4, the contact-head 27 is insulated from the body of the rockable element when the device is associated with a polyphase system, because otherwise operation of the relay would short circuit the line phases together; but, for association with a direct-current circuit, the insulation is unnecessary, and the contact-head may constitute one pole of the interlock, thereby making necessary the employment of only a single stationary contact (as 28 or 29), in the manner exemplified by Fig. 7.

The invention also is adapted, in such form as exemplified by Figs. 4 and 5, for use both as a no-load relay and an over-load relay. In that form, the movable armatures 23 and 24 are mounted to swing independently on the pivot 20, and each of them carries an arm 26 provided with a contact-head 27 contactable with contacts 28 and 29 or 28' and 29'. One of the armatures (24 for example), when in attracted position, holds the contact-head of its arm 26 in contact with the fixed contacts 28 and 29; and the other armature (23), when in open position, holds the contact-head of its arm 26 in contact with the other fixed contacts 28' and 29', that armature being weighted, or associated with a spring 34, so that it offers more resistance to being attracted toward the fixed armature than in the case of the other armature 23. When normal operative conditions pertain in the current element, the armature 24 is kept in attracted position and its contact-head is held against the contacts 28 and 29, and the armature 23 remains in open position and its contact-head is against the contacts 28' and 29'. On occurrence of abnormal conditions in the current element, one or the other of the contact-heads is opened from the fixed contacts. For example, when the current in the current element falls to such a point that its attraction of the armature 24 is insufficient to keep its contact-head against the fixed contacts, the circuit in which those contacts are included is opened and the desired protective results are effected; and, when there is sufficient overload in the current element, the armature 23 is attracted toward it and its contact-head opened from its fixed contacts and the same circuit, or another, dependent upon the particular arrangement, is opened.

The device may be used as an adjunct or auxiliary to existing control systems. It is susceptible of association with single-phase, polyphase, and direct-current controllers, circuit-breakers, compensators, or oil switches that include no-voltage release means. No-voltage release attachments, as now used with starters of various characteristics, are more or less satisfactory in functioning to open a motor-circuit when the entire line becomes dead, but they are not satisfactorily effective when a single leg of a polyphase circuit becomes opened, because a sustaining circuit remains by way of motor-windings.

The device not only is adapted to prevent accidental single-phase operation of polyphase motors and to the protection of direct-current motors, feeders, and other devices against overloads, but it also is available for employment with thermostatic control of electric heaters in cars and elsewhere for automatically interrupting the heater circuits whenever the motor current exceeds a predetermined value and thus removing the heater current from the peak of the motor current and thereby decreasing the power-station stand-by capacity required and improving the voltage and power-factor conditions of line and substations.

A device whose operation depends on the voltages between the legs of a polyphase system is ineffective in preventing single-phase operation, because, even when one leg becomes open circuited, the protective device may be held inoperative by current supplied from the motor by a phase that remains active. Therefore, the actuating force must be current of the main circuit. The electromagnetic relay provided by this invention is of advantage over devices heretofore comomnly employed for the same purpose, in that the necessity of expensive coils and current transformers is avoided.

As an example of one of the methods of use of the device, the contacts 27, 28, and 29, constituting the interlock, may be arranged to function to open circuit or to short circuit the no-voltage release-coil usually associated with starters.

Thus a three-phase motor would have three of the devices associated therewith, the current element of each relay being connected into one leg of the circuit or into a shunt of that leg. On a quarter-phase circuit, two of the relay units would be used.

Assuming that the no-voltage release-coil of the starter is to be deenergized by opening its circuit, this circuit would include the interlocks or auxiliary contacts of all the relays connected in series, and the contacts are open when the movable armatures are in unattracted positions. If the no-voltage release-coil of the starter has a resistance in series with it and the coil is to be deenergized by short circuiting it, then one of the fixed contacts of all relays together would be connected to one side of the no-voltage release-coil and the other fixed contacts of all relays together with the other side of that coil, and the contacts would be closed by the movable contact-heads when the armatures are in open position.

If the no-voltage release-coil is to be opened by the action of the relay, the contact-head 27 and the contacts 28 and 29 are out of contact when there is no current in the current element and the no-voltage release circuit is open. On closing the starter, if the starting current is sufficient to cause the armatures to function to swing the contact-head, the interlock contacts will be closed and the starting-handle is held in its final position by the no-voltage release device; but, if the starting current is not sufficient to operate the relay, then it is necessary to reset it by means of the trip-lever 31, as otherwise the no-voltage release device on the starter would not hold the handle over in its final position. Once the relay is closed, very little current in the current element will keep it closed. If, while the motor is operating, a fuse blows in that leg, the relay will operate under the influence of gravity or the spring, because there no longer is sufficient current in the current element to keep it closed, and the no-voltage release circuit will be opened, permitting the no-voltage release device to release the starter.

If, on the other hand, the no-voltage release coil is to be deenergized by short circuiting it, then the relay contacts normally are held open as long as there is current in the current element sufficient to attract the movable armatures; and, when the current is interrupted or sufficiently diminished, the relay is released and the contact-head moves against the fixed contacts and thereby short circuits the release-coil. If the starting current of the motor is insufficient to cause the relay to assume the on position, it is necessary to set it by the trip lever 31 at the time of starting, in order that the no-voltage release device may hold the starter-handle in its final position.

For the purpose of setting forth more specifically several methods of associating the device in circuits, as examples of the adaptability thereof to various uses, the installations illustrated diagrammatically by Figs. 7, 8, 9, 10, and 11 are explained:

In Fig. 7, SC indicates a short-circuiting conductor connected to the contact 28 and to a circuit that includes a thermostat (not shown) and a coil X arranged to open and close a switch Y of a heater circuit. When the motor current exceeds a predetermined value, as when throwing the controller from series to parallel combination, contact of arm 27 and point 28, which normally are open, short circuits the coil X and causes the switch Y to open and thereby open the heater circuit. If that switch happens to be open, contact between arm 27 and the point 28 will prevent it from closing until the current in the motor circuit drops sufficiently to release the armature of the relay.

Fig. 8 shows the application of three protecting relays to a three-phase motor system, having a no-voltage release-coil S of a compensator or other starter. This coil is connected directly across two legs of the circuit in a conventional manner by conductors C, except that the connection is through three pairs of fixed contacts 28 and 29. In the position of the parts as shown, the armatures keep the coil circuit closed by maintaining the contact-heads against the fixed contacts. If any phase leg becomes open, the relay of that circuit will release and open the no-voltage release circuit and thereby permit such release attachment as may be associated with the system to open the main circuit.

In Fig. 9 there is shown the application of three relays to a three-phase motor system having a no-voltage release-coil S arranged to be deenergized by short-circuiting, the armatures being shown in attracted position as in the case of Fig. 8. With such an arrangement, a resistance R is required in the coil circuit C. If any phase leg becomes open, the contact-head 27 associated therewith closes against the fixed contacts 28 and 29 and short circuits the coil through conductors SC.

Fig. 10 shows a method of avoiding the necessity of varying the current-carrying capacity of the current element of the device to suit the current of a motor with which it is associated. Instead of inserting the current elements directly into the legs of the motor circuit, each of the relays may be connected by leads L and L', which are tapped to a suitable length of the motor wires, and the current element in each such shunt circuit then carries only a part of the total motor current of the leg with which it is associated. On failure of the current in any lead to maintain the armatures closed, the relay operates to move the contact-head with respect to the fixed contacts to effect the desired result.

Fig. 11 has reference to the form of device hereinbefore referred to with respect to Figs. 4 and 5. Two legs of the motor circuit are connected by conductors C through the no-voltage release-coil S and the fixed contacts 28—29 and 28'—29'. The movable parts are shown in the positions they have with normal operative conditions pertaining in the current element, the armatures 24 being attracted toward that element and holding its contact-head bridged across the contacts 28 and 29 and the armature 23 being in unattracted position and holding its contact-head bridged across the contacts 28' and 29', and the coil-circuit is closed. If the current in the current element ceases or diminishes to such a degree that the armature 24 no longer is attracted thereto, the contact-head of that armature opens the coil-circuit; or, if there is sufficient overload in the current element, the armature 23 is attracted thereto and the coil-circuit opened.

Having thus described my invention, what I claim as new, and desire to secure by Letters Patent, is—

1. In a protective device for an electric system, a current element comprising conductor-connecting members, alined straight armatures fixed to said members constituting conductor parts of said element, an intermediate part between said armatures, movable armatures on said intermediate part arranged to be affected by said fixed armatures, and circuit make-and-break means controlled by said movable armatures.

2. In a protective device for an electric system, a current element comprising conductor-connecting members, alined straight armatures fixed to said members constituting conductor parts of said element, an intermediate part between said armatures, armatures swingably mounted on said intermediate part arranged to be affected by said fixed armatures, and circuit make-and-break means controlled by said swingable armatures.

3. In a protective device for an electric system, a current element comprising conductor-connecting members, alined straight armatures fixed to said members constituting conductor parts of said element, an intermediate slotted part connecting said armatures, armatures swingably mounted in said intermediate part arranged to be affected by said fixed armatures, and circuit make-and-break means controlled by said swingable armatures.

4. In a protective device for an electric system, a current element comprising a fixed armature, a swingably-mounted member having oppositely-extending armatures movable toward and from opposite sides of said fixed armature, and current make-and-break means controlled by said member.

5. In a protective device for an electric system, a current element comprising a fixed armature, a member swingably mounted on said armature and having oppositely-extending armatures movable toward and from opposite sides of said fixed armature, and current make-and-break means controlled by said member.

6. In a protective device for an electric system, a current element comprising a fixed armature, an arm swingably mounted thereon and extending laterally therefrom, oppositely-extending armatures on said arm movable toward and from opposite sides of said fixed armature, and current make-and-break means controlled by said arm.

In testimony whereof I affix my signature.

EUGENE CHILTON PARHAM.